United States Patent
Wong

(10) Patent No.: US 10,804,782 B2
(45) Date of Patent: Oct. 13, 2020

(54) ENERGY CONSERVING POWER GENERATOR

(71) Applicant: Shou Cheng Wong, Kaohsiung (TW)

(72) Inventor: Shou Cheng Wong, Kaohsiung (TW)

( * ) Notice: Subject to any disclaimer, the term of this patent is extended or adjusted under 35 U.S.C. 154(b) by 40 days.

(21) Appl. No.: 16/409,112

(22) Filed: May 10, 2019

(65) Prior Publication Data

US 2019/0356205 A1 Nov. 21, 2019

(30) Foreign Application Priority Data

May 17, 2018 (TW) .............................. 107116731 A

(51) Int. Cl.
| | |
|---|---|
| *H02K 21/38* | (2006.01) |
| *H01F 38/14* | (2006.01) |
| *H02K 16/04* | (2006.01) |
| *H02K 35/02* | (2006.01) |

(52) U.S. Cl.
CPC ............. *H02K 21/38* (2013.01); *H01F 38/14* (2013.01); *H02K 16/04* (2013.01); *H02K 35/02* (2013.01)

(58) Field of Classification Search
CPC .. H02K 7/00; H02K 7/04; H02K 7/09; H02K 7/18; H02K 7/1807; H02K 16/00; H02K 16/04; H02K 21/10; H02K 21/12; H02K 21/24; H02K 21/38; H02K 35/00; H02K 35/02; H02K 53/00; H01F 38/14; F16F 15/00; F16F 15/31; F16F 15/315; F16F 15/3156; F16C 32/00; F16C 32/04; F16C 32/042; F16C 32/0425; F16C 32/043; F16C 32/0431; F16C 39/00; F16C 39/06; F16C 39/063; G01R 11/00; G01R 11/14
See application file for complete search history.

(56) References Cited

U.S. PATENT DOCUMENTS

| | | | | |
|---|---|---|---|---|
| 3,469,134 | A * | 9/1969 | Beyersdorf et al. ... | H02K 19/24 310/164 |
| 5,177,392 | A * | 1/1993 | Scott ........................ | H02K 1/02 310/268 |
| 8,115,364 | B2* | 2/2012 | Minowa ................. | H02K 16/00 310/268 |
| 2004/0090134 | A1* | 5/2004 | Ide ......................... | H02K 19/38 310/112 |
| 2014/0191624 | A1* | 7/2014 | Jahshan .................... | H02P 6/14 310/68 B |

\* cited by examiner

*Primary Examiner* — Tran N Nguyen
(74) *Attorney, Agent, or Firm* — Thomas J. Nikolai; DeWitt LLP

(57) ABSTRACT

An energy conserving power generator has a frame, a transmitting device, and a power generating device. The transmitting device and the power generating device are disposed in the frame. The power generating device has a coil disposing board, multiple coil seats, multiple coils, a conductor, multiple rotating shafts, and multiple rotating magnets. The coil disposing board is fixed on the frame. The multiple coil seats are disposed at spaced intervals on the coil disposing board. Each one of the multiple coils is winded around a respective one of the multiple coil seats. The conductor is fixed on the transmitting shaft. Each one of the multiple rotating shafts passes through the coil disposing board. Each one of the multiple rotating magnets is mounted to a respective one of the multiple rotating shafts, is adjacent to the conductor, and extends into two of the multiple coils winded around two corresponding coil seats.

20 Claims, 11 Drawing Sheets

ENERGY CONSERVING POWER GENERATOR

BACKGROUND OF THE INVENTION

1. Field of the Invention

The present invention relates to a power generator, and more particularly to an energy conserving power generator using Lenz's law to make magnets rotate and generate power.

2. Description of Related Art

A conventional power generator utilizes a transmitting device to transmit kinetic energy provided from an energy source to a power generating device of the conventional power generator. The power generating device may thereby convert the kinetic energy into electric energy. In virtue of energy loss from frictional resistance, the kinetic energy provided by the energy source is converted ineffectively.

To promote the efficiency of the conventional power generator, the inventor has invented a conventional vertically mounted and magnetically driven power generator. Each one of the power generators has a frame, multiple magnetic drive assemblies, and a transmitting shaft. The multiple magnetic drive assemblies are mounted with vertically arranged multiple shelves of the frame, respectively. The transmitting shaft is disposed through the multiple magnetic drive assemblies and connected to a power generating device. In addition, the transmitting shaft has multiple magnets, and the multiple magnets are applied with axial magnetic forces provided by the multiple magnetic drive assemblies. The transmitting shaft may therefore rotate and float uprightly in the frame without frictional contacts. As a result, the kinetic energy is effectively transmitted into rotational energy of the transmitting shaft, and further triggers the power generator. Loss of energy due to friction may be reduced, and efficiency in power generation is promoted.

However, weight of the power generating device of the conventional power generator is too heavy, which disables the multiple magnetic drive assemblies from providing enough magnetic forces to offset the weight of the power generating device of the conventional power generator. Therefore, a floating effect provided by the multiple magnetic drive assemblies to the transmitting shaft is not good. A bottom of the transmitting shaft still contacts the frame, and frictional forces between the bottom of the transmitting shaft and the frame decrease rotating speed of the transmitting shaft. Power generating efficiency of the conventional power generator is decreased thereby.

To overcome the shortcomings of the conventional power generator, the present invention tends to provide an energy conserving power generator to mitigate or obviate the aforementioned problems.

SUMMARY OF THE INVENTION

The main objective of the present invention is to provide an energy conserving power generator to improve poor power generating efficiency caused by heavy weight of the power generating device of the conventional power generator.

The energy conserving power generator has a frame, a transmitting device, a power generating device, multiple magnetic levitation modules, multiple radial magnetic stabilizing modules, and an axial magnetic stabilizing module. The frame has an axis defined at a center of the frame vertically. The transmitting device is disposed in the frame, is located at the axis of the frame, and has a transmitting shaft and a driving assembly. The transmitting shaft is mounted to the frame vertically, is located at the axis of the frame, and is rotatable. The driving assembly is mounted to the transmitting shaft. The power generating device is disposed in the frame, and has a coil disposing board, multiple coil seats, multiple coils, a conductor, multiple rotating shafts, and multiple rotating magnets. The coil disposing board is fixed on the frame. The multiple coil seats are disposed at spaced intervals on the coil disposing board. Each one of the multiple coils is winded around a respective one of the multiple coil seats. The conductor is fixed on the transmitting shaft and is located above the coil disposing board.

The multiple rotating shafts surround the transmitting shaft. Each one of the multiple rotating shafts passes through the coil disposing board, is located between two of the multiple coil seats, and is rotatable. Each one of the multiple rotating magnets is mounted to a respective one of the multiple rotating shafts, is disposed adjacent to the conductor, and extends into two of the multiple coils winded around two corresponding coil seats. The multiple magnetic levitation modules are disposed in the frame, and are mounted to the transmitting shaft. Each one of the multiple magnetic levitation modules has a fixed board, an axial magnetic block, and an inner annular magnet assembly. The fixed board is fixed on the frame and has a conical hole formed at a center of the fixed board. The conical hole has an inner diameter gradually decreasing from a top of the fixed board to a bottom of the fixed board. The axial magnetic block is fixed on the transmitting shaft and is located in the conical hole. The inner annular magnet assembly is mounted in the conical hole, is spaced at an interval from the axial magnetic block, and magnetically interacts with the axial magnetic block.

The multiple radial magnetic stabilizing modules are disposed in the frame, and are mounted to the transmitting shaft. Each one of the multiple radial magnetic stabilizing modules has a positioning board, an inner magnetic block, and an inner magnetic ring. The positioning board is fixed on the frame and has a passing hole formed at a center of the positioning board. The inner magnetic block is fixed on the transmitting shaft and is located in the passing hole, and has a north magnetic pole and a south magnetic pole. The inner magnetic ring is mounted in the passing hole, is spaced at an interval from the inner magnetic block, and has a north magnetic pole facing the north magnetic pole of the inner magnetic block and a south magnetic pole facing the south magnetic pole of the inner magnetic block. The axial magnetic stabilizing module is disposed in the frame, is mounted to the transmitting shaft, and has a base board, a fixed magnetic ring, and an adjusting magnetic block. The base board is fixed on the frame and has a mounting hole formed through a center of the base board. The fixed magnetic ring is mounted to the mounting hole. The adjusting magnetic block is mounted to the transmitting shaft, is disposed above the fixed magnetic ring, and is magnetically repulsive to the fixed magnetic ring.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
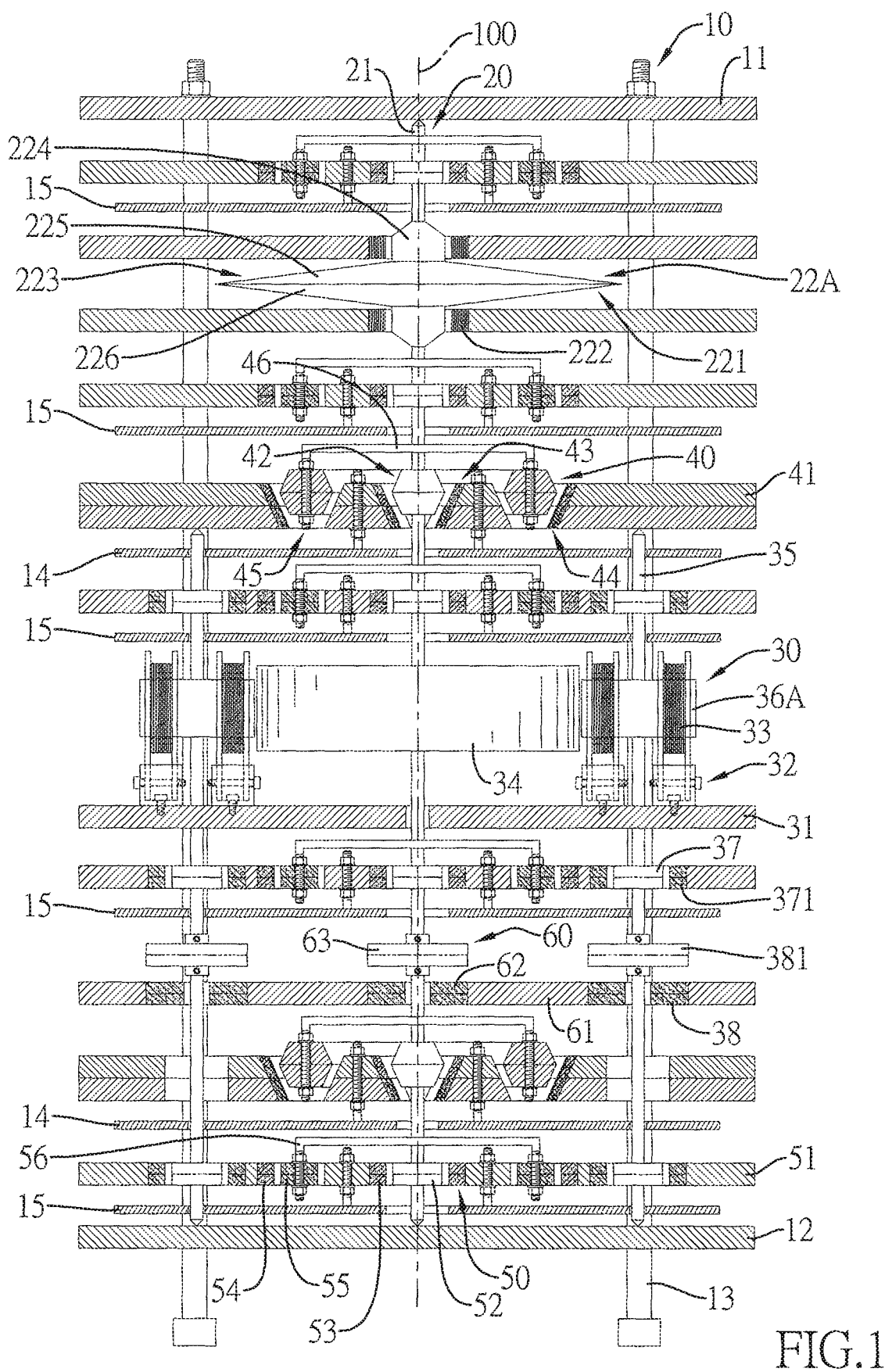
FIG. 1 is a side view in partial section of a first embodiment of an energy conserving power generator in accordance with the present invention.
Figure 3:
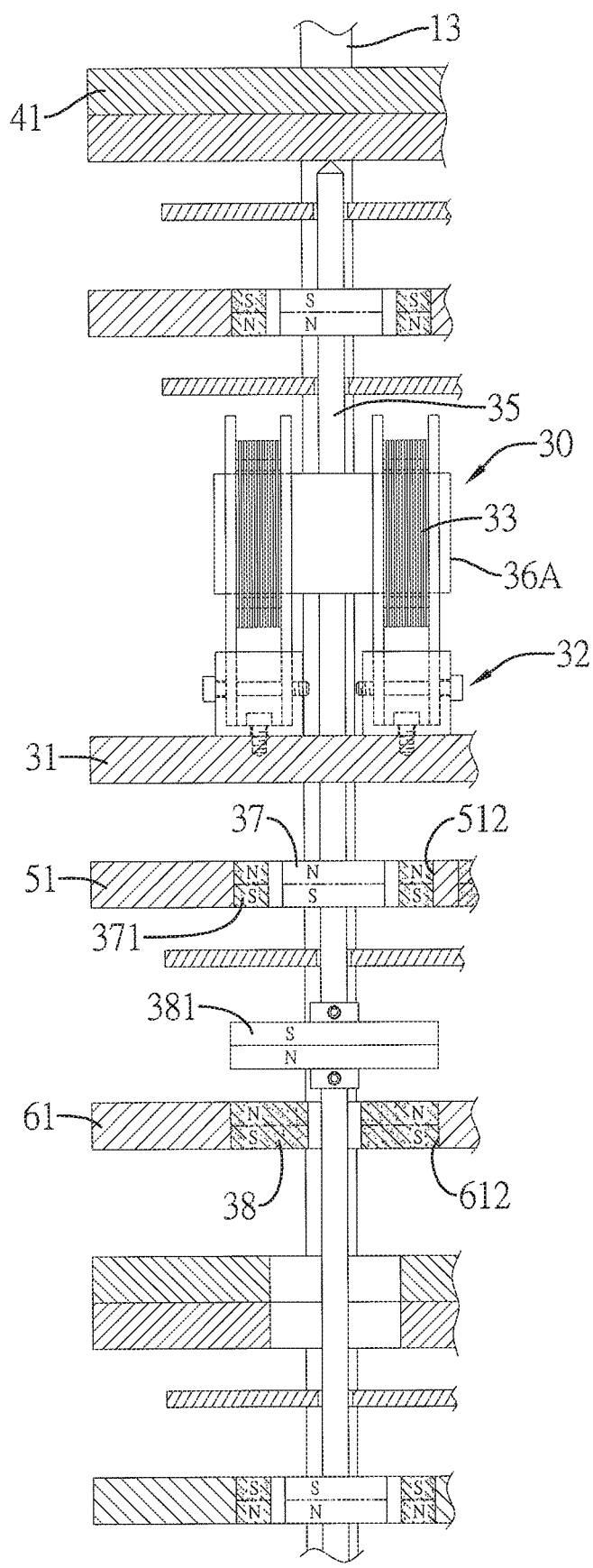
FIG. 3 is an enlarged cross-sectional side view in partial section of the energy conserving power generator in FIG. 1.
Figure 4:
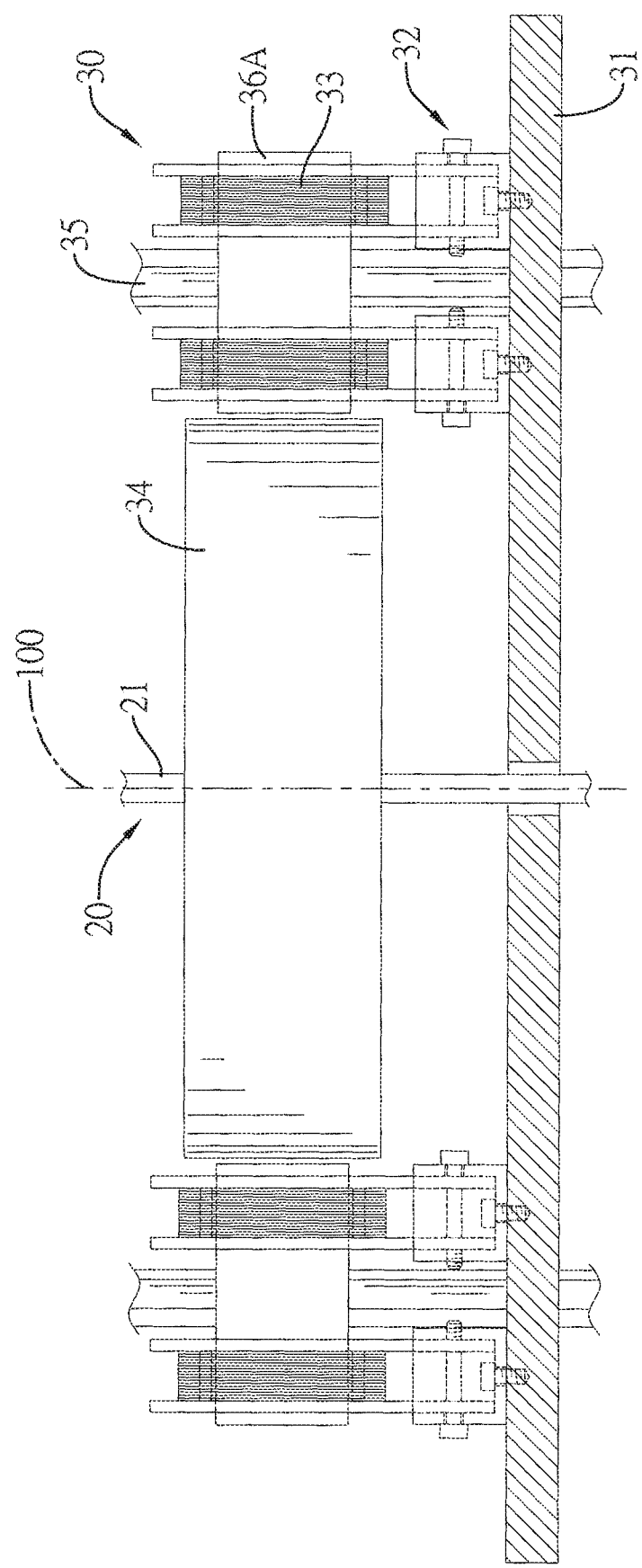
FIG. 4 is a cross-sectional side view of a power generating assembly of the energy conserving power generator in FIG. 1.

With reference to FIGS. 1, 3, and 4, a first embodiment of an energy conserving power generator in accordance with the present invention comprises a frame 10, a transmitting device 20, a power generating device 30, multiple magnetic levitation modules 40, multiple radial magnetic stabilizing modules 50, and an axial magnetic stabilizing module 60. A number of the axial magnetic stabilizing modules 60 is changeable according to practical need.

With reference to FIGS. 1, 3, and 4, the frame 10 has an axis 100 defined at a center of the frame 10 vertically. In the present invention, the frame 10 has a top board 11, a bottom board 12, multiple supports 13, multiple first supporting rods 14, and multiple second supporting rods 15. The top board 11 and the bottom board 12 are arranged at a spaced interval vertically and are disposed on the frame 10. Each one of the multiple supports 13 is vertically connected to the top board 11 and the bottom board 12, and the multiple supports 13 are disposed separately. The multiple first supporting rods 14 are mounted to the multiple supports 13 at spaced intervals. The multiple second supporting rods 15 are mounted to the multiple supports 13 at spaced intervals.

Figure 2:
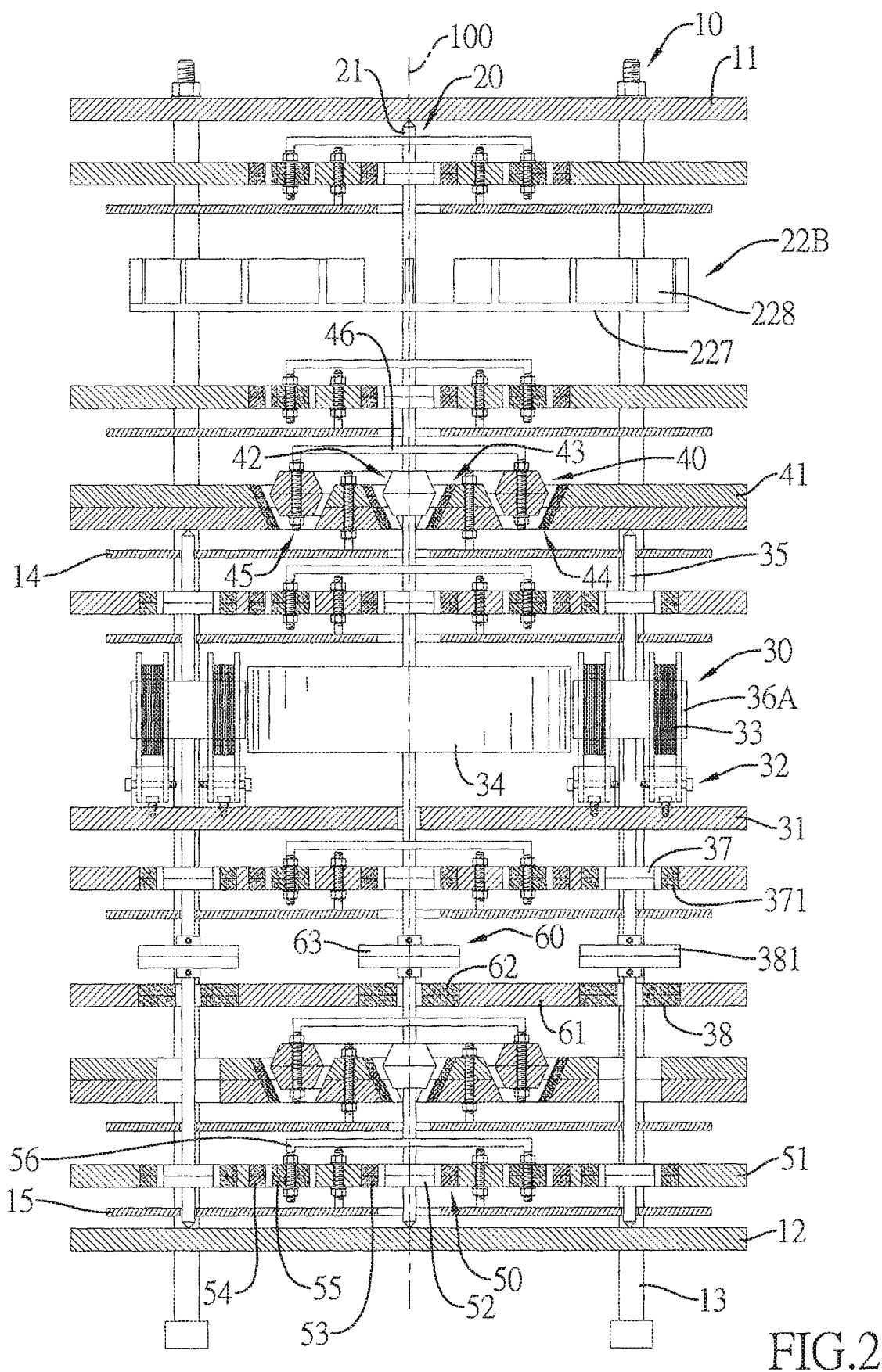
FIG. 2 is a side view in partial section of a second embodiment of an energy conserving power generator in accordance with the present invention.
Figure 5:
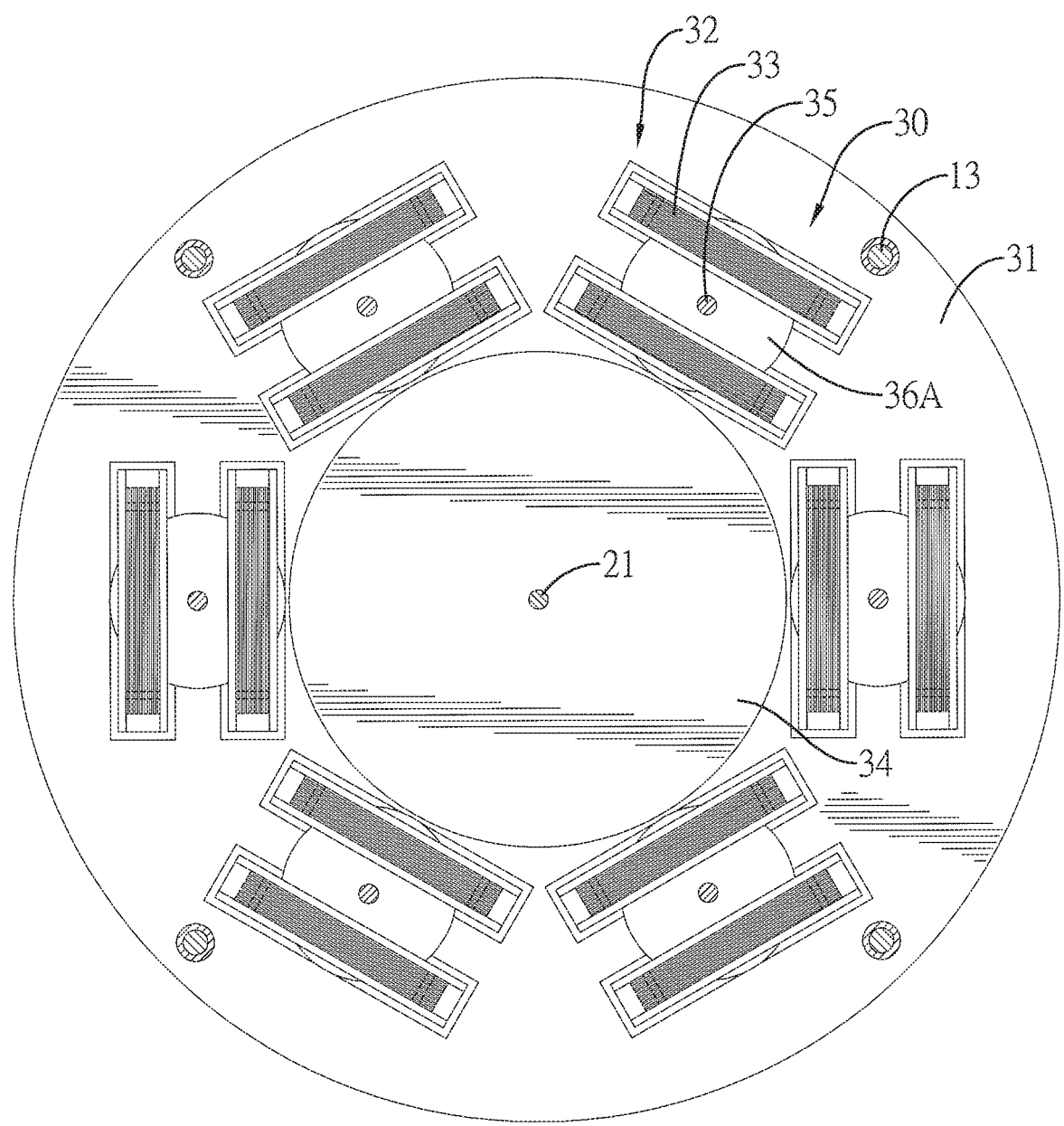
FIG. 5 is a cross-sectional top view of the power generating assembly of the energy conserving power generator in FIG. 1.

With reference to FIGS. 1, 4, and 5, the transmitting device 20 is disposed in the frame 10, is located at the axis 100 of the frame 10, and has a transmitting shaft 21 and a driving assembly 22A. The transmitting shaft 21 is mounted to the frame 10 vertically, is located at the axis 100 of the frame 10, and is rotatable. The driving assembly 22A is mounted to the transmitting shaft 21. In the first embodiment of the energy conserving power generator, the driving assembly 22A is a motor having a rotor 221 and two stators 222. The rotor 221 is fixed on the transmitting shaft 21. The two stators 222 are fixed on the frame 10 and located at a top end and a bottom end of the rotor 221 respectively. The rotor 221 has a flywheel 223 and two permanent magnets 224 disposed at a top end and a bottom end of the flywheel 223 respectively. The flywheel 223 has an upper portion 225 and a lower portion 226 integrally formed at a bottom of the upper portion 225. The upper portion 225 is a cone with gradually increasing sizes of circumferences from a top of the upper portion 225 to the bottom of the upper portion 225. The lower portion 226 is a cone with gradually decreasing sizes of circumferences from a top of the lower portion 226 to a bottom of the lower portion 226. The upper portion 225 and the lower portion 226 make the flywheel 223 a symmetrical structure. In the second embodiment of the energy conserving power generator as shown in FIG. 2, the driving assembly 22B is a wind-driven machine having a rotating annulus 227 and multiple blades 228. The rotating annulus 227 is fixed on the transmitting shaft 21. The multiple blades 228 are annularly disposed on the rotating annulus 227 at spaced intervals.

With reference to FIGS. 1, 3, and 5, the power generating device 30 is disposed in the frame 10 and surrounds the transmitting device 20. In the present invention, the power generating device 30 surrounds the transmitting device 20 and is located between the top board 11 and the bottom board 12. The position at which the power generating device 30 is disposed in the frame 10 is not limited to the disclosure of the present invention. The power generating device 30 has a coil disposing board 31, multiple coil seats 32, multiple coils 33, a conductor 34, multiple rotating shafts 35, and multiple rotating magnets 36A, 36B, 36C.

The coil disposing board 31 is fixed on the frame 10. The multiple coil seats 32 are disposed annularly at spaced intervals on the coil disposing board 31. Each one of the multiple coils 33 is winded around a respective one of the multiple coil seats 32. The conductor 34 is fixed on the transmitting shaft 21 and is located above the coil disposing board 31. Each one of the multiple rotating shafts 35 passes through the coil disposing board 31, is located between two of the multiple coil seats 32, and is rotatable. The multiple rotating shafts 35 surround the transmitting shaft 21. Each one of the multiple rotating magnets 36A 36B, 36C is mounted to a respective one of the multiple rotating shafts 35, is disposed adjacent to the conductor 34, and extends into two of the multiple coils 33 winded around two corresponding coil seats 32. In the present invention, the conductor 34 is made of aluminum.

Figure 6:
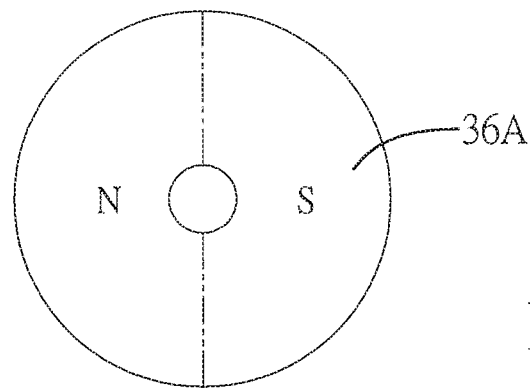
FIG. 6 is a cross-sectional top view of a first configuration of a rotating magnet of the energy conserving power generator in FIG. 1.
Figure 7:
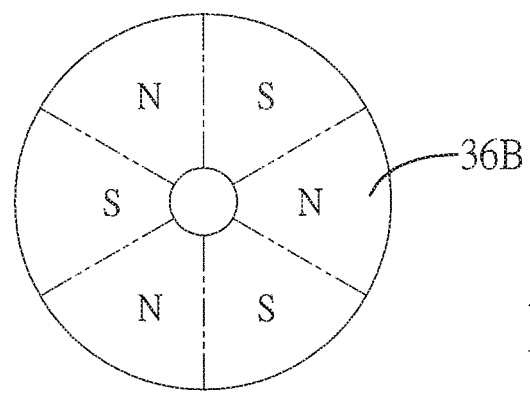
FIG. 7 is a cross-sectional top view of a second configuration of a rotating magnet of the energy conserving power generator in FIG. 1.
Figure 8:
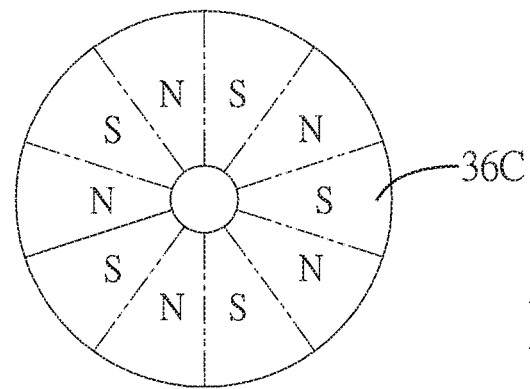
FIG. 8 is a cross-sectional top view of a third configuration of a rotating magnet of the energy conserving power generator in FIG. 1.

With reference to FIGS. 4 to 6, north magnetic poles and south magnetic poles of each one of the multiple rotating magnets 36A 36B, 36C are disposed adjacently and form a disc together. Each one of the multiple rotating magnets 36A 36B, 36C has at least one pair of magnetic poles surrounding a corresponding one of the multiple rotating shafts 35. In the present invention, numbers of pairs of magnetic poles on each one of the multiple rotating magnets 36A 36B, 36C are odd numbers. As shown in FIG. 6, each one of the multiple rotating magnets 36A has a pair of magnetic poles, which means each one of the multiple rotating magnets 36A has a north magnetic pole and a south magnetic pole. As shown in FIG. 7, each one of the multiple rotating magnets 36B has three pairs of magnetic poles, which means each one of the multiple rotating magnets 36B has three north magnetic poles and three south magnetic poles. As shown in FIG. 8, each one of the multiple rotating magnets 36C has five pairs of magnetic poles, which means each one of the multiple rotating magnets 36C has five north magnetic poles and five south magnetic poles.

Figure 9:
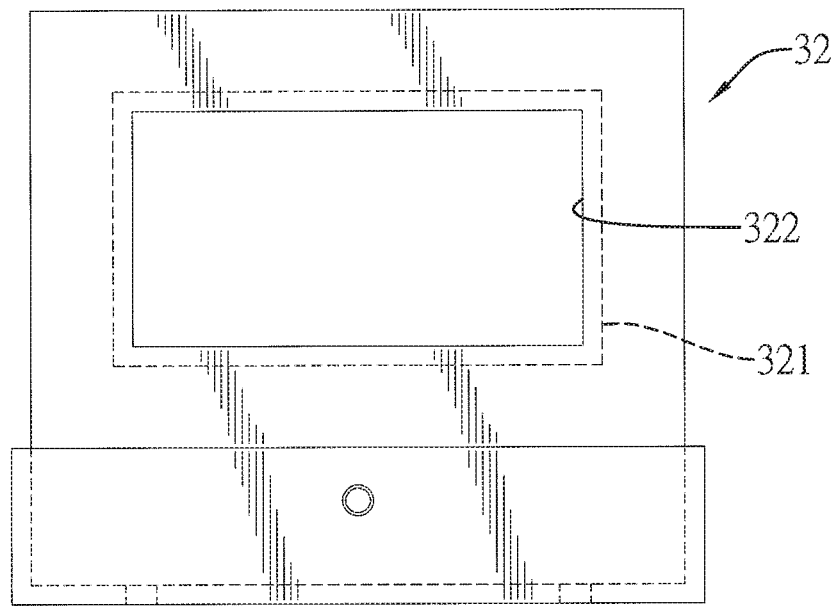
FIG. 9 is a side view of a coil seat of the energy conserving power generator in FIG. 1.
Figure 10:
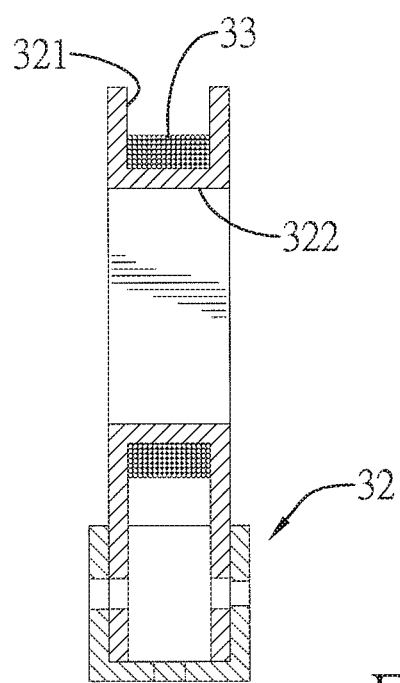
FIG. 10 is a cross-sectional front view of the coil seat of the energy conserving power generator in FIG. 1.

Furthermore, with reference to FIGS. 5, 9, and 10, each one of the multiple coil seats 32 has a trench 321 and a receiving hole 322. The trench 321 is formed around the coil seat 32. The receiving hole 322 is formed through the coil seat 32, is located at a center of the coil seat 32, and is surrounded by the trench 321. Each one of the multiple coils 33 is winded around the trench 321 of a respective one of the multiple coil seats 32. Since each one of the multiple rotating shafts 35 is located between two of the multiple coil seats 32 and each one of the multiple rotating magnets 36A, 36B, 36C is mounted to a respective one of the multiple rotating shafts 35, each one of the multiple rotating magnets 36A, 36B, 36C extends into a respective one of the receiving holes 322 of the two coil seats 32. With reference to FIGS. 3 and 4, the conductor 34 and the multiple rotating magnets 36A, 36B, 36C form a single layer. Moreover, a number of layers formed by the conductor 34 and the multiple rotating magnets 36A, 36B, 36C is changeable, so there may be multiple layers formed by the conductor 34 and the multiple rotating magnets 36A, 36B, 36C.

Figure 11:
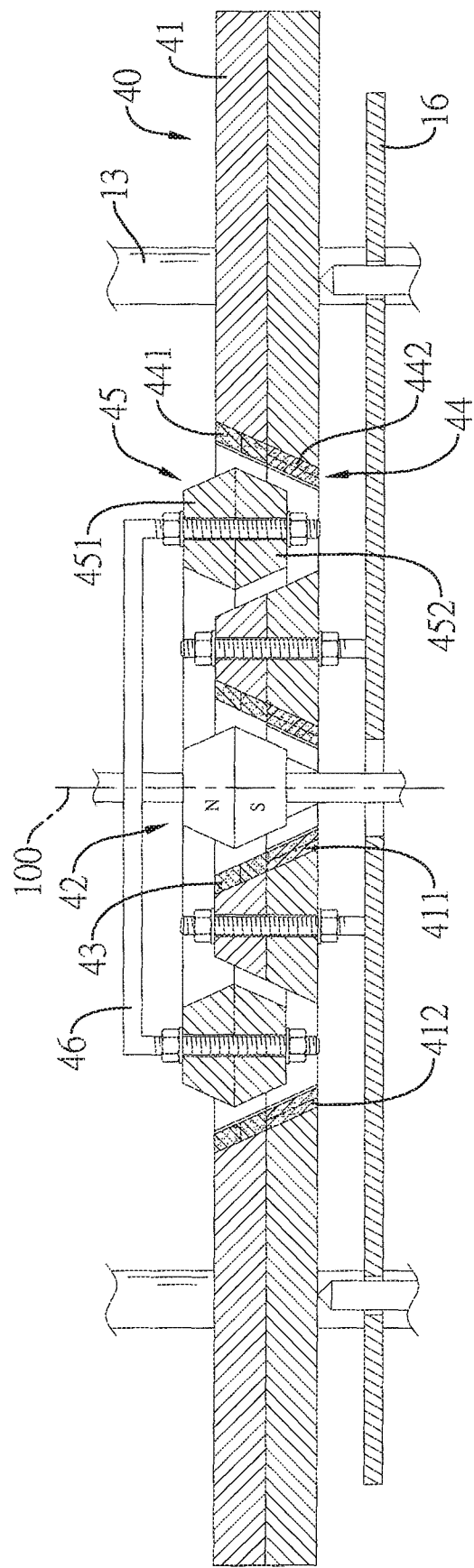
FIG. 11 is a side view in partial section of a magnetic levitation module of the energy conserving power generator in FIG. 1.
Figure 11A:
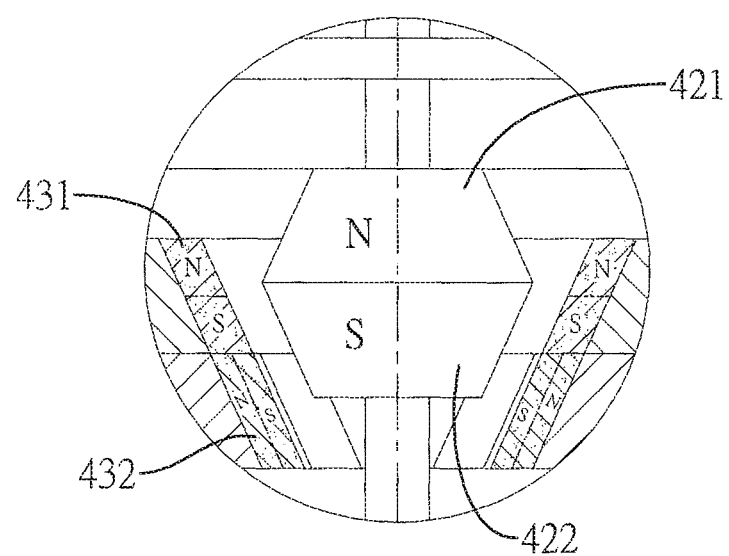
FIG. 11A is an enlarged side view in partial section of the magnetic levitation module of the energy conserving power generator in FIG. 11.

With reference to FIGS. 1 and 11, the multiple magnetic levitation modules 40 are disposed in the frame 10 and are mounted to the transmitting shaft 21. In the present invention, the energy conserving power generator comprises two magnetic levitation modules 40, but a number of the magnetic levitation modules 40 is not limited to disclosure of the present invention. One of the two magnetic levitation modules 40 is disposed adjacent to the driving assembly 22A, 22B. The other one of the two magnetic levitation modules 40 is disposed adjacent to the bottom board 12 of the frame 10. In the preferred embodiment, the two magnetic levitation modules 40 are disposed above and below the conductor 34 respectively. The positions at which the multiple magnetic levitation modules 40 are located are not limited to the disclosure of the present invention.

With reference to FIGS. 1 and 11, each one of the multiple magnetic levitation modules 40 has a fixed board 41, an axial magnetic block 42, and an inner annular magnet assembly 43. The fixed board 41 is fixed on the multiple supports 13 of the frame 10 and one of the multiple first supporting rods 14. The fixed board 41 has a conical hole 411 formed at a center of the fixed board 41, and the conical hole 411 has an inner diameter gradually decreasing from a top of the fixed board 41 to a bottom of the fixed board 41. The axial magnetic block 42 is fixed on the transmitting shaft 21 and is located in the conical hole 411. The inner annular magnet assembly 43 is mounted in the conical hole 411 and surrounds the axial magnetic block 42, and a gap is formed between the inner annular magnet assembly 43 and the axial magnetic block 42. Magnetic force exists between the inner annular magnet assembly 43 and the axial magnetic block 42.

Furthermore, each one of the multiple magnetic levitation modules 40 has an annular magnet assembly 44, a permanent magnet ring 45, and a connecting bracket 46. An angular conical groove 412 is formed through the fixed board 41, and widths thereof gradually decrease from a top of the angular conical groove 412 to a bottom of the angular conical groove 412. The annular magnet assembly 44 is mounted to the angular conical groove 412. The permanent magnet ring 45 is mounted to the connecting bracket 46 fixed on the transmitting shaft 21, is located in the angular conical groove 412 of the fixed board 41, is surrounded by the annular magnet assembly 44, and has a center located at the axis 100 of the frame 10. Due to magnetic repulsion arising between the permanent magnet ring 45 and the annular magnet assembly 44, the transmitting shaft 21 floats in the frame 10, and a gap is formed between the permanent magnet ring 45 and the annular magnet assembly 44 at the same time.

With reference to FIGS. 1 and 11, the permanent magnet ring 45 of each one of the multiple magnetic levitation modules 40 has an upper magnetic pole section 451 and a lower magnetic pole section 452 disposed at a bottom of the upper magnetic pole section 451. The upper magnetic pole section 451 is a cone with gradually increasing sizes of circumferences from a top of the upper magnetic pole section 451 to the bottom of the upper magnetic pole section 451. The lower magnetic pole section 452 is a cone with gradually decreasing sizes of circumferences from a top of the lower magnetic pole section 452 to the bottom of the lower magnetic pole section 452. The upper magnetic pole section 451 and the lower magnetic pole section 452 are symmetric about an annular ridge formed between the upper magnetic pole section 451 and the lower magnetic pole section 452. The upper magnetic pole section 451 and the lower magnetic pole section 452 are unlike magnetic poles.

The annular magnet assembly 44 has a first magnetic component 441 and a second magnetic component 442 both mounted in the angular conical groove 412. The magnetic component 442 is disposed adjacent to the first magnetic component 441, and the second magnetic component 442 is disposed under the first magnetic component 441. A north magnetic pole and a south magnetic pole of the first magnetic component 441 are arranged axially. A north magnetic pole and a south magnetic pole of the second magnetic component 442 are arranged radially. Magnetic repulsions acting between the upper magnetic pole section 451 and the lower magnetic pole section 452 of the permanent magnet ring 45 and the first magnetic component 441 and the second magnetic component 442 of the annular magnet assembly 44 enable the transmitting shaft 21 to float in the frame 10.

With reference to FIGS. 1 and 11, the axial magnetic block 42 has an upper magnetic pole part 421 and a lower magnetic pole part 422 under the upper magnetic pole part 421. The upper magnetic pole part 421 is a cone with gradually increasing sizes of circumferences from a top of the upper magnetic pole part 421 to the bottom of the magnetic pole part 421. The lower magnetic pole part 422 is a cone with gradually decreasing sizes of circumferences from a top of the lower magnetic pole part 422 to the bottom of the lower magnetic pole part 422. The upper magnetic pole part 421 and the lower magnetic pole part 422 are symmetric about an annular ridge formed on a connection of the upper magnetic pole part 421 and the lower magnetic pole part 422. The upper magnetic pole part 421 and the lower magnetic pole part 422 are unlike poles.

The inner annular magnet assembly 43 has a first magnetic element 431 and a second magnetic element 432 under the first magnetic element 431 both mounted in the conical hole 411. The second magnetic element 432 is disposed adjacent to the first magnetic element 431, and the second magnetic element 432 is disposed under the first magnetic element 431. A north magnetic pole and a south magnetic pole of the first magnetic element 431 are arranged axially. A north magnetic pole and a south magnetic pole of the second magnetic element 432 are arranged radially. Magnetic repulsions acting between the upper magnetic pole part 421 and the lower magnetic pole part 422 of the axial magnetic block 42 and the first magnetic element 431 and the second magnetic element 432 of the inner annular magnet assembly 43 provide auxiliary magnetic forces to floating of the transmitting shaft 21 in the frame 10.

Figure 12:
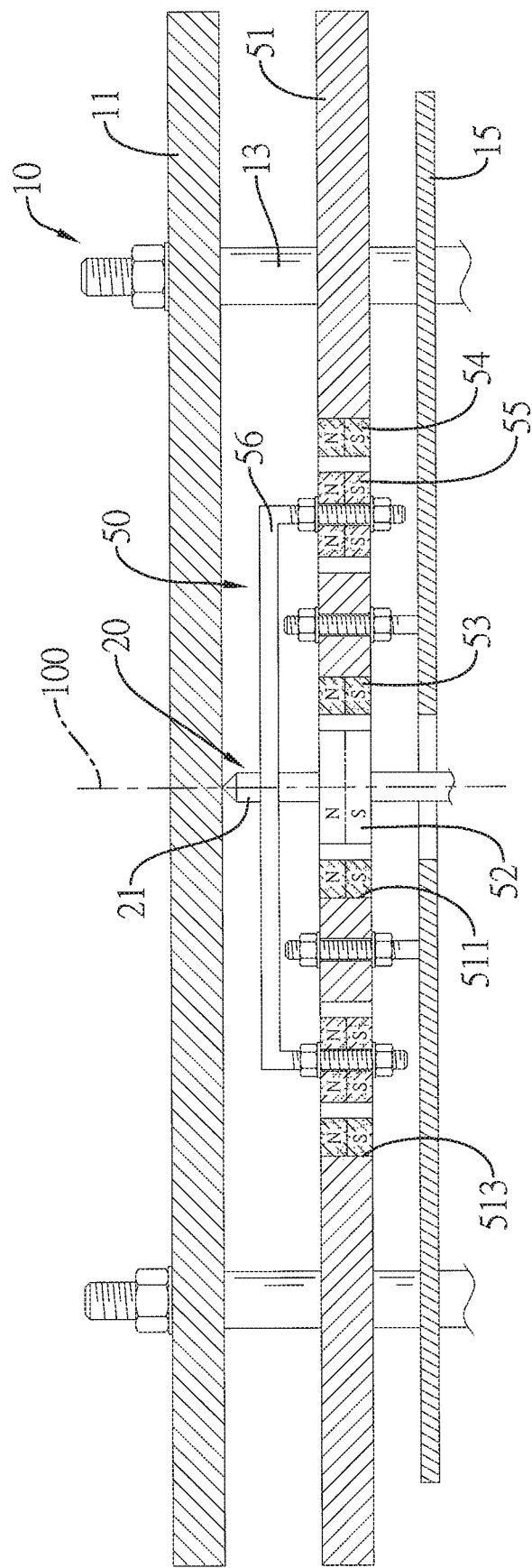
FIG. 12 is a side view in partial section of a radial magnetic stabilizing module of the energy conserving power generator in FIG. 1.

With reference to FIGS. 1 and 12, the multiple radial magnetic stabilizing modules 50 are disposed in the frame 10 and are mounted to the transmitting shaft 21. In the present invention, the energy conserving power generator comprises five radial magnetic stabilizing modules 50. However, a number of the multiple radial magnetic stabilizing modules 50 is not limited to the numbers disclosed in the present invention. One of the five radial magnetic stabilizing modules 50 is disposed between the top board of the frame 10 and the driving assembly 22A, 22B. One of the five radial magnetic stabilizing modules 50 is disposed between the driving assembly 22A, 22B and one of the two magnetic levitation modules 40 adjacent to the driving assembly 22A, 22B. One of the five radial magnetic stabilizing modules 50 is disposed between one of the two magnetic levitation modules 40 adjacent to the driving assembly 22A, 22B and the conductor 34. One of the five radial magnetic stabilizing modules 50 is disposed between the conductor 14 and one of the two magnetic levitation modules 40 disposed adjacent to the bottom board 12. The other one of the five radial magnetic stabilizing modules 50 is disposed between one of the two magnetic levitation modules 40 disposed adjacent to the bottom board 12 and the bottom board 12. Besides, positions at which the multiple radial magnetic stabilizing modules 50 are disposed in the frame are not limited to disclosure of the present invention.

With reference to FIGS. 1, 3, and 12, each one of the multiple radial magnetic stabilizing modules 50 has a positioning board 51, an inner magnetic block 52, and an inner magnetic ring 53. The positioning board 51 is fixed on the multiple supports 13 of the frame 10 and one of the multiple second supporting rods 15. The positioning board 51 has a passing hole 511 formed at a center thereof and multiple through holes 512 disposed around the passing hole 511. The inner magnetic block 52 is fixed on the transmitting shaft 21 and is located in the passing hole 511. The inner magnetic ring 53 is mounted in the passing hole 511 and surrounds the inner magnetic block 52, and a gap is formed between the inner magnetic ring 53 and the inner magnetic block 52. A north magnetic pole of the inner magnetic ring 53 faces a north magnetic pole of the inner magnetic block 52, and a south magnetic pole of the inner magnetic ring 53 faces a south magnetic pole of the inner magnetic block 52

Furthermore, each one of the multiple radial magnetic stabilizing modules 50 has a magnet assembly ring 54, a magnetic ring 55, and a linking bracket 56. An annular groove 513 is formed through the positioning board 51, and the magnet assembly ring 54 is mounted in the annular groove 513. The magnetic ring 55 is mounted to the linking bracket 56 fixed on the transmitting shaft 21, is located in the annular groove 513 of the positioning board 51, is surrounded by the magnet assembly ring 54, and has a center located at the axis 100 of the frame 10. Radial magnetic repulsion arising between the magnet assembly ring 54 and the magnetic ring 55 about the axis 100 of the frame 10 provide a balancing effect to rotation of the transmitting shaft 21. Moreover, a north magnetic pole and a south magnetic pole of the magnet assembly ring 54 are arranged axially. A north magnetic pole and a south magnetic pole of the magnetic ring 55 are arranged axially. The north magnetic pole of the magnet assembly ring 54 faces the north magnetic pole of the magnetic ring 55, and the south magnetic pole of the magnet assembly ring 54 faces the south magnetic pole of the magnetic ring 55. Therefore, radial magnetic repulsions arise between the magnet assembly ring 54 and the magnetic ring 55 and a gap is formed between the magnet assembly ring 54 and the magnetic ring 55.

Figure 13:
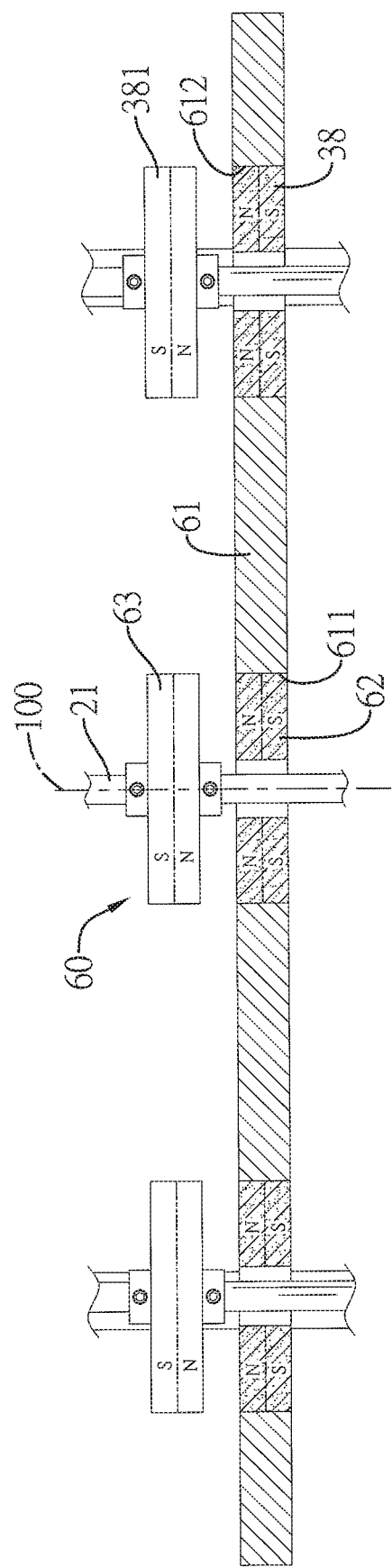
FIG. 13 is a side view in partial section of an axial magnetic stabilizing module of the energy conserving power generator in FIG. 1.

With reference to FIGS. 1 and 13, the axial magnetic stabilizing module 60 is disposed in the frame 10 and is mounted to the transmitting shaft 21. In the present invention, the axial magnetic stabilizing module 60 is located above one of the two magnetic levitation modules 40 disposed adjacent to the bottom board 12. However, a position at which the axial magnetic stabilizing module 60 is located in the frame 10 is not limited to the disclosure of the present invention.

With reference to FIGS. 1 and 13, the axial magnetic stabilizing module 60 has a base board 61, a fixed magnetic ring 62, and an adjusting magnetic block 63. The base board 61 is fixed on the frame 10 and has a mounting hole 611 and multiple connecting holes 612. The mounting hole 611 is formed through a center of the base board 61. The multiple connecting holes 612 are disposed around the mounting hole 611 at spaced intervals. The fixed magnetic ring 62 is mounted to the mounting hole 611. The adjusting magnetic block 63 is mounted to the transmitting shaft 21, and is disposed above the fixed magnetic ring 62. A gap is formed between the adjusting magnetic block 63 and the fixed magnetic ring 62 due to magnetic repulsion between the adjusting magnetic block 63 and the fixed magnetic ring 62.

Moreover, with reference to FIGS. 1, 3, and 5, the power generating device 30 has multiple radial magnets 37, multiple radial magnetic rings 371, at least one axial magnetic ring 38, and at least one axial magnet 381. Each one of the multiple radial magnets 37 is fixed on a respective one of the multiple rotating shafts 35 and is located in a respective one of the multiple through holes 512. Each one of the multiple radial magnetic rings 371 is mounted to a respective one of the multiple through holes 512 of the positioning board 51 and surrounds a corresponding one of the multiple radial magnets 37. A gap is formed between each one of the multiple radial magnetic rings 371 and a corresponding one of the multiple radial magnets 37 surrounded. A north magnetic pole of each one of the multiple radial magnetic rings 371 faces a north magnetic pole of a corresponding one of the multiple radial magnets 37 surrounded, and a south magnetic pole of each one of the multiple radial magnetic rings 371 faces a south magnetic pole of a corresponding one of the multiple radial magnets 37 surrounded. The at least one axial magnetic ring 38 is mounted to one of the multiple connecting holes 612. The at least one axial magnet 381 is mounted to one of the multiple rotating shafts 35. A gap is formed between the at least one axial magnet 381 and the at least one axial magnetic ring 38 due to magnetic repulsion between the at least one axial magnet 381 and the at least one axial magnetic ring 38.

With reference to FIGS. 1, 4, and 5, when the energy conserving power generator is in use, the driving assembly 22A, 22B is driven to rotate by an external power source inputted, and the transmitting shaft 21 is also driven thereby. In the first embodiment wherein the driving assembly 22A is a motor, the transmitting shaft 21 is driven to rotate by the kinetic energy outputted from the driving assembly 22A, 22B. In the second embodiment wherein the driving assembly 22B is a wind-driven machine as shown in FIG. 2, wind blows the multiple blades 228 and in turn propels the rotating annulus 227 to rotate. Then the transmitting shaft 21 is driven to rotate thereby.

With reference to FIGS. 1, 4, and 5, since weight of the transmitting shaft 21 is offset by the magnetic repulsions exerted by the multiple magnetic levitation modules 40, the transmitting shaft 21 floats vertically in the frame 10. The transmitting shaft 21 and the conductor 34 are rotatable about the axis 100 in the frame 10 at the same time. While the conductor 34 is rotating, the magnetic forces exerted by the multiple rotating magnets 36A, 36B, 36C around the conductor 34 keep the magnetic flux in the conductor 34 changing. As the magnetic flux in the conductor 34 keeps changing, eddy current is induced in the conductor 34. The eddy current drives the multiple rotating magnets 36A, 36B, 36C around the conductor 34 to rotate. When each one of the multiple rotating magnets 36A, 36B, 36C rotates, variation of magnetic field caused by each one of the multiple rotating magnets 36A, 36B, 36C causes induced current on two of the multiple coils 33 winded around the two corresponding coil seats 32 that each one of the multiple rotating magnets 36A, 36B, 36C extends into. Electricity is generated thereby.

With reference to FIGS. 1, 4, and 5, since weight of the transmitting shaft 21 is offset by the magnetic repulsions exerted by the multiple magnetic levitation modules 40, the transmitting shaft 21 can rotate in the frame 10 with decreased frictional force. Torque and rotating speed of the transmitting shaft 21 are thus increased. Rotating speed of the conductor 34 fixed on the transmitting shaft 21 is also increased, so the eddy current induced in the conductor 34 is also increased. Increased eddy current further makes rotation speed of each one of the multiple rotating magnets 36A, 36B, 36C higher. Furthermore, since the at least one axial magnet 381 is mounted to one of the multiple rotating shafts 35 and is located above the at least one axial magnetic ring 38, magnetic repulsion between the at least one axial magnet 381 and the at least one axial magnetic ring 38 enables the multiple rotating shafts 35 to rotate in the frame 10 with decreased frictional force.

Because the multiple rotating shafts 35 can rotate in the frame 10 with decreased frictional force, the energy conserving power generator has further energy-saving effect. Moreover, the multiple radial magnetic stabilizing modules 50 provide the transmitting shaft 21 with radial magnetic repulsion. The radial magnetic repulsion provided by the multiple radial magnetic stabilizing modules 50 prevent the transmitting shaft 21 from deviating and oscillating radially, which further stabilizes the transmitting shaft 21 while rotating at a high rotating speed. Each one of the multiple radial magnetic rings 371 also provides a corresponding one of the multiple radial magnets 37 with radial magnetic repulsion, which prevents the corresponding one of the multiple radial magnets 37 from deviating and oscillating radially, and stabilizes a corresponding one of the multiple rotating shafts 35 fixed with the radial magnet 37 while rotating at a high rotating speed.

Overall, after the driving assembly 22A, 22B of the transmitting device 20 is driven to rotate, the transmitting shaft 21 and the conductor 34 are rotatable in the frame 10. While the conductor 34 is rotating, the magnetic forces exerted by the multiple rotating magnets 36A, 36B, 36C around the conductor 34 keep the magnetic flux in the conductor 34 changing. As the magnetic flux in the conductor 34 keeps changing, eddy current is induced in the conductor 34. The eddy current drives the multiple rotating magnets 36A, 36B, 36C around the conductor 34 to rotate. When each one of the multiple rotating magnets 36A, 36B, 36C rotates, variation of magnetic field caused by each one of the multiple rotating magnets 36A, 36B, 36C causes induced current on two of the multiple coils 33 winded around the two corresponding coil seats 32 that each one of the multiple rotating magnets 36A, 36B, 36C extends into.

Since the power generating device 30 has the multiple rotating magnets 36A, 36B, 36C and the multiple coils 33, power generating efficiency is thereby enhanced. Compared to the conventional power generating device, structures of the transmitting device 20 and the conductor 34 are simplified, and weights of the transmitting device 20 and the conductor 34 are also decreased. Decreased weights of the transmitting device 20 and the conductor 34 enable the multiple magnetic levitation modules 40 to provide the transmitting shaft 21 with better floating effect. In addition, magnetic repulsions provided by the multiple radial magnetic stabilizing modules 50 prevent the transmitting shaft 21 from deviating and oscillating radially while rotating at the high rotating speed. Magnetic repulsions provided by the axial magnetic stabilizing module 60 prevent the transmitting shaft 21 from deviating and oscillating axially while rotating at the high rotating speed.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An energy conserving power generator comprising:
    a frame having an axis defined at a center of the frame vertically;
    a transmitting device disposed in the frame, located at the axis of the frame, and having
        a transmitting shaft mounted to the frame vertically, located at the axis of the frame, and being rotatable; and
        a driving assembly mounted to the transmitting shaft;
    a power generating device disposed in the frame and having
        a coil disposing board fixed on the frame;
        multiple coil seats disposed at spaced intervals on the coil disposing board;
        multiple coils, and each one of the multiple coils wound around a respective one of the multiple coil seats;
        a conductor fixed on the transmitting shaft and located above the coil disposing board;
        multiple rotating shafts surrounding the transmitting shaft, and each one of the multiple rotating shafts passing through the coil disposing board, located between two of the multiple coil seats, and being rotatable; and
        multiple rotating magnets, and each one of the multiple rotating magnets mounted to a respective one of the multiple rotating shafts, disposed adjacent to the conductor, and extending into two of the multiple coils wound around two corresponding coil seats;
    multiple magnetic levitation modules disposed in the frame, mounted to the transmitting shaft, and each one of the multiple magnetic levitation modules having
        a fixed board fixed on the frame and having
            a conical hole formed at a center of the fixed board, and having
                an inner diameter gradually decreasing from a top of the fixed board to a bottom of the fixed board;
            an axial magnetic block fixed on the transmitting shaft and located in the conical hole; and an inner annular magnet assembly mounted in the conical hole, forming a gap from the axial magnetic block, and magnetically interacting with the axial magnetic block;

multiple radial magnetic stabilizing modules disposed in the frame, mounted to the transmitting shaft, and each one of the multiple radial magnetic stabilizing modules having
- a positioning board fixed on the frame and having a passing hole formed at a center thereof;
- an inner magnetic block fixed on the transmitting shaft, located in the passing hole, and having
  - a north magnetic pole; and
  - a south magnetic pole; and
- an inner magnetic ring mounted in the passing hole, forming a gap from the inner magnetic block, and having
  - a north magnetic pole facing the north magnetic pole of the inner magnetic block; and
  - a south magnetic pole facing the south magnetic pole of the inner magnetic block; and an axial magnetic stabilizing module disposed in the frame, mounted to the transmitting shaft, and having
- a base board fixed on the frame and having a mounting hole formed through a center of the base board;
- a fixed magnetic ring mounted to the mounting hole; and
- an adjusting magnetic block mounted to the transmitting shaft, being above the fixed magnetic ring, magnetically repulsive to the fixed magnetic ring, and forming a gap from the fixed magnetic ring.

2. The energy conserving power generator as claimed in claim 1, wherein
the positioning board has multiple through holes disposed around the passing hole;
the base board has multiple connecting holes disposed around the mounting hole;
the power generating device has
- multiple radial magnets, and each one of the multiple radial magnets fixed on a respective one of the multiple rotating shafts and located in a respective one of the multiple through holes;
- multiple radial magnetic rings, and each one of the multiple radial magnetic rings mounted to a respective one of the multiple through holes, forming a gap from a corresponding one of the multiple radial magnets surrounded, having a north magnetic pole facing a north magnetic pole of a corresponding one of the multiple radial magnets surrounded, and having a south magnetic pole facing a south magnetic pole of a corresponding one of the multiple radial magnets surrounded;
- at least one axial magnetic ring mounted to one of the multiple connecting holes; and
- at least one axial magnet mounted to one of the multiple rotating shafts, located above the at least one axial magnetic ring, magnetically repulsive to the at least one axial magnetic ring, and forming a gap from the at least one axial magnet;

each one of the multiple rotating magnets has at least one pair of magnetic poles surrounding a corresponding one of the multiple rotating shafts, and numbers of pairs of magnetic poles on each one of the multiple rotating magnets are odd numbers;

each one of the multiple coil seats has
a trench formed around the coil seat; and
a receiving hole formed through the coil seat, located at a center of the coil seat, and surrounded by the trench; and
each one of the multiple coils is wound around the trench of a respective one of the multiple coil seats.

3. The energy conserving power generator as claimed in claim 1, wherein
the positioning board has an annular groove formed through the positioning board; and
each one of the multiple radial magnetic stabilizing modules has
a magnet assembly ring mounted in the annular groove;
a linking bracket fixed on the transmitting shaft; and
a magnetic ring mounted to the linking bracket, located in the annular groove of the positioning board, having a center located at the axis, magnetically repulsive to the magnet assembly ring about the axis, and forming a gap from the magnet assembly ring.

4. The energy conserving power generator as claimed in claim 2, wherein
the positioning board has an annular groove formed through the positioning board; and
each one of the multiple radial magnetic stabilizing modules has
a magnet assembly ring mounted in the annular groove;
a linking bracket fixed on the transmitting shaft; and
a magnetic ring mounted to the linking bracket, located in the annular groove of the positioning board, having a center located at the axis, magnetically repulsive to the magnet assembly ring about the axis, and forming a gap from the magnet assembly ring.

5. The energy conserving power generator as claimed in claim 1, wherein
the fixed board has an angular conical groove formed through the fixed board, and widths thereof gradually decrease from a top of the angular conical groove to a bottom of the angular conical groove; and
each one of the multiple magnetic levitation modules has
an annular magnet assembly mounted to the angular conical groove;
a connecting bracket fixed on the transmitting shaft; and
a permanent magnet ring mounted to the connecting bracket, located in the angular conical groove of the fixed board, having a center located at the axis, magnetically repulsive to the annular magnet assembly to float the transmitting shaft in the frame, and forming a gap from the annular magnet assembly.

6. The energy conserving power generator as claimed in claim 2, wherein
the fixed board has an angular conical groove formed through the fixed board, and widths thereof gradually decrease from a top of the angular conical groove to a bottom of the angular conical groove; and
each one of the multiple magnetic levitation modules has
an annular magnet assembly mounted to the angular conical groove;
a connecting bracket fixed on the transmitting shaft; and
a permanent magnet ring mounted to the connecting bracket, located in the angular conical groove of the fixed board, having a center located at the axis, magnetically repulsive to the annular magnet assembly to float the transmitting shaft in the frame, and forming a gap from the annular magnet assembly.

7. The energy conserving power generator as claimed in claim 3, wherein the fixed board has an angular conical groove formed through the fixed board, and widths thereof gradually decrease from a top of the angular conical groove to a bottom of the angular conical groove; and each one of the multiple magnetic levitation modules has
an annular magnet assembly mounted to the angular conical groove;
a connecting bracket fixed on the transmitting shaft; and
a permanent magnet ring mounted to the connecting bracket, located in the angular conical groove of the fixed board, having a center located at the axis, magnetically repulsive to the annular magnet assembly to float the transmitting shaft in the frame, and forming a gap from the annular magnet assembly.

8. The energy conserving power generator as claimed in claim 4, wherein
the fixed board has an angular conical groove formed through the fixed board, and widths thereof gradually decrease from a top of the angular conical groove to a bottom of the angular conical groove; and
each one of the multiple magnetic levitation modules has
an annular magnet assembly mounted to the angular conical groove;
a connecting bracket fixed on the transmitting shaft; and
a permanent magnet ring mounted to the connecting bracket, located in the angular conical groove of the fixed board, having a center located at the axis, magnetically repulsive to the annular magnet assembly to float the transmitting shaft in the frame, and forming a gap from the annular magnet assembly.

9. The energy conserving power generator as claimed in claim 5, wherein
the permanent magnet ring of each one of the multiple magnetic levitation modules has
an upper magnetic pole section being a cone with gradually increasing sizes of circumferences from a top of the upper magnetic pole section to a bottom of the upper magnetic pole section; and
a lower magnetic pole section disposed at the bottom of the upper magnetic pole section, being a cone with gradually decreasing sizes of circumferences from a top of the lower magnetic pole section to a bottom of the lower magnetic pole section, being symmetric about an annular ridge formed between the upper magnetic pole section and the lower magnetic pole section, and being unlike to the upper magnetic pole section;
the annular magnet assembly of each one of the multiple magnetic levitation modules has
a first magnetic component mounted in the angular conical groove, having a north magnetic pole and a south magnetic pole arranged axially, and magnetically interacting with the upper magnetic pole section of the permanent magnet ring; and
a second magnetic component mounted in the angular conical groove, disposed under the first magnetic component, disposed adjacent to the first magnetic component, having a north magnetic pole and a south magnetic pole arranged radially, and magnetically interacting with the lower magnetic pole section of the permanent magnet ring;
the axial magnetic block of each one of the multiple magnetic levitation modules has
an upper magnetic pole part being a cone with gradually increasing sizes of circumferences from a top of the upper magnetic pole part to a bottom of the upper magnetic pole part; and
a lower magnetic pole part disposed under the upper magnetic pole part, being a cone with gradually decreasing sizes of circumferences from a top of the lower magnetic pole part to a bottom of the lower magnetic pole part, being symmetric about an annular ridge formed on a connection of the upper magnetic pole part and the lower magnetic pole part, and being unlike to the upper magnetic pole; and
the inner annular magnet assembly has
a first magnetic element mounted in the conical hole, having a north magnetic pole and a south magnetic pole arranged axially, and magnetically interacting with the upper magnetic pole part of the axial magnetic block; and
a second magnetic element mounted in the conical hole, disposed under the first magnetic element, disposed adjacent to the first magnetic element, having a north magnetic pole and a south magnetic pole arranged radially, and magnetically interacting with the lower magnetic pole part of the axial magnetic block.

10. The energy conserving power generator as claimed in claim 6, wherein
the permanent magnet ring of each one of the multiple magnetic levitation modules has
an upper magnetic pole section being a cone with gradually increasing sizes of circumferences from a top of the upper magnetic pole section to a bottom of the upper magnetic pole section; and
a lower magnetic pole section disposed at the bottom of the upper magnetic pole section, being a cone with gradually decreasing sizes of circumferences from a top of the lower magnetic pole section to a bottom of the lower magnetic pole section, being symmetric about an annular ridge formed between the upper magnetic pole section and the lower magnetic pole section, and being unlike to the upper magnetic pole section;
the annular magnet assembly of each one of the multiple magnetic levitation modules has
a first magnetic component mounted in the angular conical groove, having a north magnetic pole and a south magnetic pole arranged axially, and magnetically interacting with the upper magnetic pole section of the permanent magnet ring; and
a second magnetic component mounted in the angular conical groove, disposed under the first magnetic component, disposed adjacent to the first magnetic component, having a north magnetic pole and a south magnetic pole arranged radially, and magnetically interacting with the lower magnetic pole section of the permanent magnet ring;
the axial magnetic block of each one of the multiple magnetic levitation modules has
an upper magnetic pole part being a cone with gradually increasing sizes of circumferences from a top of the upper magnetic pole part to a bottom of the upper magnetic pole part; and
a lower magnetic pole part disposed under the upper magnetic pole part, being a cone with gradually decreasing sizes of circumferences from a top of the lower magnetic pole part to a bottom of the lower magnetic pole part, being symmetric about an annular ridge formed on a connection of the upper magnetic pole part and the lower magnetic pole part, and being unlike to the upper magnetic pole; and the inner annular magnet assembly has
- a first magnetic element mounted in the conical hole, having a north magnetic pole and a south magnetic pole arranged axially, and magnetically interacting with the upper magnetic pole part of the axial magnetic block; and
- a second magnetic element mounted in the conical hole, disposed under the first magnetic element, disposed adjacent to the first magnetic element, having a north magnetic pole and a south magnetic pole arranged radially, and magnetically interacting with the lower magnetic pole part of the axial magnetic block.

11. The energy conserving power generator as claimed in claim 7, wherein the permanent magnet ring of each one of the multiple magnetic levitation modules has
- an upper magnetic pole section being a cone with gradually increasing sizes of circumferences from a top of the upper magnetic pole section to a bottom of the upper magnetic pole section; and
- a lower magnetic pole section disposed at the bottom of the upper magnetic pole section, being a cone with gradually decreasing sizes of circumferences from a top of the lower magnetic pole section to a bottom of the lower magnetic pole section, being symmetric about an annular ridge formed between the upper magnetic pole section and the lower magnetic pole section, and being unlike to the upper magnetic pole section;

the annular magnet assembly of each one of the multiple magnetic levitation modules has
- a first magnetic component mounted in the angular conical groove, having a north magnetic pole and a south magnetic pole arranged axially, and magnetically interacting with the upper magnetic pole section of the permanent magnet ring; and
- a second magnetic component mounted in the angular conical groove, disposed under the first magnetic component, disposed adjacent to the first magnetic component, having a north magnetic pole and a south magnetic pole arranged radially, and magnetically interacting with the lower magnetic pole section of the permanent magnet ring;

the axial magnetic block of each one of the multiple magnetic levitation modules has
- an upper magnetic pole part being a cone with gradually increasing sizes of circumferences from a top of the upper magnetic pole part to a bottom of the upper magnetic pole part; and
- a lower magnetic pole part disposed under the upper magnetic pole part, being a cone with gradually decreasing sizes of circumferences from a top of the lower magnetic pole part to a bottom of the lower magnetic pole part, being symmetric about an annular ridge formed on a connection of the upper magnetic pole part and the lower magnetic pole part, and being unlike to the upper magnetic pole; and the inner annular magnet assembly has
- a first magnetic element mounted in the conical hole having a north magnetic pole and a south magnetic pole arranged axially, and magnetically interacting with the upper magnetic pole part of the axial magnetic block; and
- a second magnetic element mounted in the conical hole, disposed under the first magnetic element, disposed adjacent to the first magnetic element, having a north magnetic pole and a south magnetic pole arranged radially, and magnetically interacting with the lower magnetic pole part of the axial magnetic block.

12. The energy conserving power generator as claimed in claim 8, wherein the permanent magnet ring of each one of the multiple magnetic levitation modules has
- an upper magnetic pole section being a cone with gradually increasing sizes of circumferences from a top of the upper magnetic pole section to a bottom of the upper magnetic pole section; and
- a lower magnetic pole section disposed at the bottom of the upper magnetic pole section, being a cone with gradually decreasing sizes of circumferences from a top of the lower magnetic pole section to a bottom of the lower magnetic pole section, being symmetric about an annular ridge formed between the upper magnetic pole section and the lower magnetic pole section, and being unlike to the upper magnetic pole section;

the annular magnet assembly of each one of the multiple magnetic levitation modules has
- a first magnetic component mounted in the angular conical groove, having a north magnetic pole and a south magnetic pole arranged axially, and magnetically interacting with the upper magnetic pole section of the permanent magnet ring; and
- a second magnetic component mounted in the angular conical groove, disposed under the first magnetic component, disposed adjacent to the first magnetic component, having a north magnetic pole and a south magnetic pole arranged radially, and magnetically interacting with the lower magnetic pole section of the permanent magnet ring;

the axial magnetic block of each one of the multiple magnetic levitation modules has
- an upper magnetic pole part being a cone with gradually increasing sizes of circumferences from a top of the upper magnetic pole part to a bottom of the upper magnetic pole part; and
- a lower magnetic pole part disposed under the upper magnetic pole part, being a cone with gradually decreasing sizes of circumferences from a top of the lower magnetic pole part to a bottom of the lower magnetic pole part, being symmetric about an annular ridge formed on a connection of the upper magnetic pole part and the lower magnetic pole part, and being unlike to the upper magnetic pole; and the inner annular magnet assembly has
- a first magnetic element mounted in the conical hole having a north magnetic pole and a south magnetic pole arranged axially, and magnetically interacting with the upper magnetic pole part of the axial magnetic block; and
- a second magnetic element mounted in the conical hole, disposed under the first magnetic element, disposed adjacently to the first magnetic element, having a north magnetic pole and a south magnetic pole arranged radially, and magnetically interacting with the lower magnetic pole part of the axial magnetic block.

13. The energy conserving power generator as claimed in claim 1, wherein the driving assembly is a motor having a rotor fixed on the transmitting shaft; and two stators fixed on the frame, located at a top end and a bottom end of the rotor respectively, and having a flywheel having an upper portion being a cone with gradually increasing sizes of circumferences from a top of the upper portion to a bottom of the upper portion; and a lower portion integrally formed at the bottom of the upper portion, being a cone with gradually decreasing sizes of circumferences from a top of the lower portion to a bottom of the lower portion, such that the upper and lower portions of the flywheel are symmetrical with each other; and two permanent magnets disposed at a top end and a bottom end of the flywheel respectively.

14. The energy conserving power generator as claimed in claim 2, wherein the driving assembly is a motor having a rotor fixed on the transmitting shaft; and two stators fixed on the frame, located at a top end and a bottom end of the rotor respectively, and having a flywheel having an upper portion being a cone with gradually increasing sizes of circumferences from a top of the upper portion to a bottom of the upper portion; and a lower portion integrally formed at the bottom of the upper portion, being a cone with gradually decreasing sizes of circumferences from a top of the lower portion to a bottom of the lower portion, such that the upper and lower portions of the flywheel are symmetrical with each other; and two permanent magnets disposed at a top end and a bottom end of the flywheel respectively.

15. The energy conserving power generator as claimed in claim 3, wherein the driving assembly is a motor having a rotor fixed on the transmitting shaft; and two stators fixed on the frame, located at a top end and a bottom end of the rotor respectively, and having a flywheel having an upper portion being a cone with gradually increasing sizes of circumferences from a top of the upper portion to a bottom of the upper portion; and a lower portion integrally formed at the bottom of the upper portion, being a cone with gradually decreasing sizes of circumferences from a top of the lower portion to a bottom of the lower portion, such that the upper and lower portions of the flywheel are symmetrical with each other; and two permanent magnets disposed at a top end and a bottom end of the flywheel respectively.

16. The energy conserving power generator as claimed in claim 4, wherein the driving assembly is a motor having a rotor fixed on the transmitting shaft; and two stators fixed on the frame, located at a top end and a bottom end of the rotor respectively, and having a flywheel having an upper portion being a cone with gradually increasing sizes of circumferences from a top of the upper portion to a bottom of the upper portion; and a lower portion integrally formed at the bottom of the upper portion, being a cone with gradually decreasing sizes of circumferences from a top of the lower portion to a bottom of the lower portion, such that the upper and lower portions of the flywheel are symmetrical with each other; and two permanent magnets disposed at a top end and a bottom end of the flywheel respectively.

17. The energy conserving power generator as claimed in claim 5, wherein the driving assembly is a motor having a rotor fixed on the transmitting shaft; and two stators fixed on the frame, located at a top end and a bottom end of the rotor respectively, and having a flywheel having an upper portion being a cone with gradually increasing sizes of circumferences from a top of the upper portion to a bottom of the upper portion; and a lower portion integrally formed at the bottom of the upper portion, being a cone with gradually decreasing sizes of circumferences from a top of the lower portion to a bottom of the lower portion, such that the upper and lower portions of the flywheel are symmetrical with each other; and two permanent magnets disposed at a top end and a bottom end of the flywheel respectively.

18. The energy conserving power generator as claimed in claim 6, wherein the driving assembly is a motor having a rotor fixed on the transmitting shaft; and two stators fixed on the frame, located at a top end and a bottom end of the rotor respectively, and having a flywheel having an upper portion being a cone with gradually increasing sizes of circumferences from a top of the upper portion to a bottom of the upper portion; and a lower portion integrally formed at the bottom of the upper portion, being a cone with gradually decreasing sizes of circumferences from a top of the lower portion to a bottom of the lower portion, such that the upper and lower portions of the flywheel are symmetrical with each other; and two permanent magnets disposed at a top end and a bottom end of the flywheel respectively.

19. The energy conserving power generator as claimed in claim 7, wherein the driving assembly is a motor having a rotor fixed on the transmitting shaft; and two stators fixed on the frame, located at a top end and a bottom end of the rotor respectively, and having a flywheel having an upper portion being a cone with gradually increasing sizes of circumferences from a top of the upper portion to a bottom of the upper portion; and a lower portion integrally formed at the bottom of the upper portion, being a cone with gradually decreasing sizes of circumferences from a top of the lower portion to a bottom of the lower portion, such that the upper and lower portions of the flywheel are symmetrical with each other; and two permanent magnets disposed at a top end and a bottom end of the flywheel respectively.

20. The energy conserving power generator as claimed in claim 8, wherein the driving assembly is a motor having a rotor fixed on the transmitting shaft; and two stators fixed on the frame, located at a top end and a bottom end of the rotor respectively, and having a flywheel having an upper portion being a cone with gradually increasing sizes of circumferences from a top of the upper portion to a bottom of the upper portion; and a lower portion integrally formed at the bottom of the upper portion, being a cone with gradually decreasing sizes of circumferences from a top of the lower portion to a bottom of the lower portion, such that the upper and lower portions of the flywheel are symmetrical with each other; and two permanent magnets disposed at a top end and a bottom end of the flywheel respectively.

* * * * *